US010968045B1

(12) United States Patent
Westcott et al.

(10) Patent No.: US 10,968,045 B1
(45) Date of Patent: Apr. 6, 2021

(54) HYGIENIC DRUM DRIVE FOR SPIRAL CONVEYOR

(71) Applicant: John Bean Technologies Corporation, Chicago, IL (US)

(72) Inventors: Brian P. Westcott, Sandusky, OH (US); Adam J. Ramsdell, Sandusky, OH (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 16/848,305

(22) Filed: Apr. 14, 2020

(51) Int. Cl.
*B65G 33/34* (2006.01)
*B65G 33/32* (2006.01)
*B65G 21/18* (2006.01)

(52) U.S. Cl.
CPC ...... *B65G 33/34* (2013.01); *B65G 2201/0202* (2013.01)

(58) Field of Classification Search
CPC ......... B65G 21/18; B65G 33/32; B65G 33/34
USPC ....................................................... 198/778
See application file for complete search history.

(56) References Cited

U.S. PATENT DOCUMENTS

| | | | | | |
|---|---|---|---|---|---|
| 4,878,362 | A | * | 11/1989 | Tyree, Jr. ................ | A23L 3/361 62/381 |
| 5,105,934 | A | * | 4/1992 | Cawley ................... | B65G 21/18 198/778 |
| 5,191,267 | A | * | 3/1993 | Machacek .............. | B65G 21/18 198/778 |
| 5,501,319 | A | * | 3/1996 | Larson ................. | B65G 17/064 198/778 |
| 8,926,463 | B1 | * | 1/2015 | Eldor .................... | B65G 21/18 474/148 |
| 9,394,109 | B2 | * | 7/2016 | Talsma ................. | B65G 17/086 |
| 9,481,523 | B2 | * | 11/2016 | Talsma ................. | B65G 21/18 |
| 9,604,788 | B2 | * | 3/2017 | Eldor ................... | B65G 23/36 |
| 9,718,623 | B2 | * | 8/2017 | Eldor ................... | B65G 45/02 |
| 9,815,630 | B1 | * | 11/2017 | Coto ..................... | B65G 23/44 |
| 9,884,723 | B2 | * | 2/2018 | Neely ................... | B65G 23/06 |
| 10,155,627 | B2 | * | 12/2018 | Chang .................. | B65G 17/086 |
| 10,280,004 | B2 | * | 5/2019 | Perdue ................. | B65G 17/083 |
| 10,730,701 | B1 | * | 8/2020 | Westcott .............. | B65G 17/086 |
| 10,745,205 | B2 | * | 8/2020 | Breton .................. | B65G 21/18 |
| 10,766,705 | B2 | * | 9/2020 | Talsma ................. | B65G 17/086 |

* cited by examiner

*Primary Examiner* — Douglas A Hess
(74) *Attorney, Agent, or Firm* — Christensen O'Connor Johnson Kindness PLLC

(57) ABSTRACT

Drive drum bars (54) are mounted on the drive drum frame (52) of a drive drum tower (50). The drive drum bar has an "open" construction having backing frame (56) to which is mounted a cap (58) for bearing against the side of a conveyor being powered by the drive drum tower.

21 Claims, 7 Drawing Sheets

HYGIENIC DRUM DRIVE FOR SPIRAL CONVEYOR

BACKGROUND

One type of spiral conveyor employs a drive tower in the form of a cylindrical drum or cage that is driven to rotate about a vertical axis. The rotating drive tower has a plurality of parallel, generally vertical drive bars or rails spaced regularly apart around the periphery of the tower drum. Each drive member extends in length between the bottom and top of the tower. A conveyor belt follows the helical path around the tower drum typically from the bottom to the top of the drum, but also can also follow a path from the top of the drum to the bottom of the drum. An example of such a conveyor belt is shown in FIG. 1. The inside edge of the belt, such as edge 10, shown in FIG. 1, frictionally engages the drive members, which drive the belt up the tower as the tower rotates and/or down the tower as the tower rotates.

A conventional construction for drive bars is in the form of a stainless steel tube mounted to the drive tower drum with a plastic cap fitted over outer and side surfaces of the tube. An example of such includes a tube 22 and cap 24 as shown in FIGS. 2 and 3. The overlapping surfaces of the cap 24 and tube 22, as well as the hollow interior of the tube 22, provide harboring locations for pathogens to lodge and grow. Such pathogens may include *salmonella* or *listeria*. These pathogens have been responsible for multiple food safety recalls in recent years. As such, there is a need to improve the hygienic design of spiral conveyor systems, including the drive bars used with such conveyor systems.

The present disclosure seeks to provide a drum type conveyor belt drive of a more hygienic design than in the past.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an embodiment of the present disclosure, a drive drum tower includes a plurality of open profile drive drum bars disposed around the outer perimeter of the drive drum tower to face outwardly of the outer perimeter of the drive drum tower, the drive drum bar comprising:

a frame comprising spaced apart longitudinal flange sections and tie members spanning between the flange sections at spaced apart locations along the lengths of the flange sections; and a drive bar cap spanning between the flange sections to project radially outwardly from the drive drum tower to present an outward abutment drive face to a conveyor belt driven by the drive drum tower.

In any of the embodiments herein, the tie members retain the flange sections in spaced parallel relationship to each other.

In any of the embodiments herein, the flange sections present edges in the direction radially outwardly of the drive drum tower.

In any of the embodiments herein, the cap spans between the radially outward edges of the flange sections.

In any of the embodiments herein, the drive drum tower further comprising mounting attachments for mounting the drive drum bars to the drive drum tower.

In any of the embodiments herein, the mounting attachments are spaced apart along the lengths of the drive drum bars.

In any of the embodiments herein, the mounting brackets comprise mounting brackets that span between the flange sections.

In any of the embodiments herein, the drive cap defines a web portion projecting from the drive cap in the direction opposite to the abutment drive face to engage portions of the frame to retain the drive cap attached to the frame.

In any of the embodiments herein, wherein the tie members are shaped to engage and retain the web portion.

In any of the embodiments herein, wherein the web portion increases in width in the direction of projection from the cap.

In any of the embodiments herein, wherein the tie members define slots corresponding to the shape of the web portion to receive the web portion.

In any of the embodiments herein, wherein the web portion extends substantially the full length of the cap.

In any of the embodiments herein, wherein the cap is composed of a polymer material.

In any of the embodiments herein, wherein at least one groove extends along the length of the cap drive face.

In any of the embodiments herein, wherein a plurality of grooves extends along the length of the cap drive face.

In accordance with an embodiment of the present invention, an open profile drive drum bar, comprising:

a backing frame comprising spaced apart longitudinal flange sections and tie members spanning between the flange sections at spaced apart locations along the lengths of the flange sections to tie the flange together so that at least one of the edges of each flange are in alignment with each other; and a drive cap spanning between the edges of the flange sections that are in alignment with each other to present an outward abutment drive face to a conveyor belt engaged by the drive drum tower.

In accordance with any embodiment of a drive drum bar of the present disclosure, wherein the tie members retain the flange sections in spaced parallel relationship to each other.

In accordance with any embodiment of a drive drum bar of the present disclosure, further comprising attachments for mounting the drive drum bars to the drive drum tower.

In accordance with any embodiment of a drive drum bar of the present disclosure, wherein the attachments are spaced apart along the lengths of the drive drum bars.

In accordance with any embodiment of a drive drum bar of the present disclosure, wherein the attachments comprise mounting brackets span between the flange sections.

In accordance with any embodiment of a drive drum bar of the present disclosure, wherein the drive cap defines a web portion projecting from the drive cap in the direction opposite to the abutment drive face to engage portions of the metallic substrate to retain the drive cap attached to the substrate.

In accordance with any embodiment of a drive drum bar of the present disclosure, wherein the web portions extend substantially the entire length of the drive cap.

In accordance with any embodiment of a drive drum bar of the present disclosure, wherein the tie members are shaped to engage and retain the web portion.

In accordance with any embodiment of a drive drum bar of the present disclosure, wherein the web portion increases in width in the direction of projection from the cap.

In accordance with any embodiment of a drive drum bar of the present disclosure, wherein the tie members define slots corresponding to the shape of the web portion to receive the web portion.

In accordance with any embodiment of a drive drum bar of the present disclosure, wherein the web portion extends substantially the full length of the cap.

In accordance with any embodiment of a drive drum bar of the present disclosure, wherein the cap is composed of a polymer material.

In accordance with any embodiment of a drive drum bar of the present disclosure, wherein at least one groove extends along the length of the cap drive face.

In accordance with any embodiment of a drive drum bar of the present disclosure, wherein a plurality of grooves extend along the length of the cap drive face.

A spiral conveyor, comprising:

the drive drum tower in accordance with any embodiment of the present disclosure, and a conveyor having a lateral side engaged against a plurality of drive drum bars in accordance with any embodiment of the present disclosure, wherein the conveyor is arranged in a spiral around the drive drum tower.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact but may vary as long as the function that is required to be performed can be carried out. For example, in the phrase "generally circular in shape," the shape need not be exactly circular as long as the required function of the structure in question can be carried out.

In the following description and in the accompanying drawings, corresponding systems, assemblies, apparatus and units may be identified by the same part number, but with an alpha suffix. The descriptions of the parts/components of such systems assemblies, apparatus, and units that are the same or similar are not repeated so as to avoid redundancy in the present application.

Figure 4:
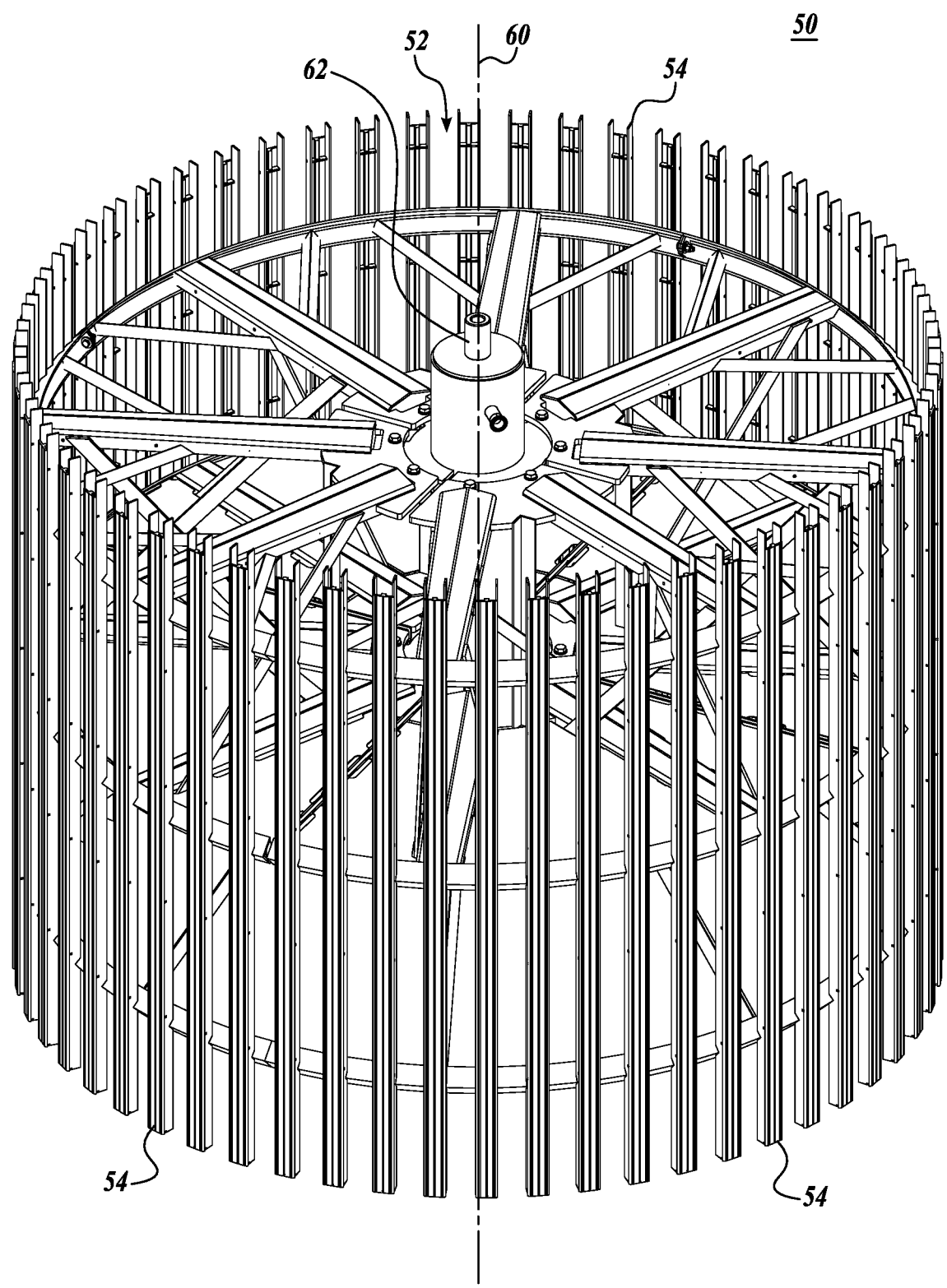
FIG. 4 is an isometric view of a drive drum utilizing the drive bars of the present disclosure.

FIG. 4 illustrates a drive drum tower 50 composed of a drive drum frame 52 on which drive drum bars 54 in accordance with the present disclosure are mounted. As shown in FIG. 4, the drive drum bars 54 extend vertically along the height of the drive drum frame 52 and are spaced around the circumference of the frame. Further, referring also to FIGS. 7-9, the drive drum bars 54 each include a backing frame 56 and drive cap 58. The back side of the frame 56 is mounted to the drive drum frame 52, and the cap 58 is mounted on the frame 56 to project outwardly from the drive drum tower 50 thereby to present an outward abutment drive face to a conveyor belt driven by the drive drum tower 50.

Next, describing the present disclosure in more detail, as noted above, the drive drum tower 50 positively drives a conveyor, such as a spiral conveyor, by rotating the drive drum tower 50 around its central axis 60. The drive drum tower 50 includes the drive drum bars 54 arranged in a circular pattern around the outer perimeter of the drive drum frame 52. The drive drum bars 54 are arranged so as to project radially outward at the outer perimeter of the drive drum frame 52. By projecting outward, the drive bars can frictionally engage with the adjacent side edge of a spiral conveyor.

The drive drum tower 50 is used, in one embodiment, to drive a conveyor in a spiral to carry items from a lower elevation to a higher elevation and/or vice versa. However, the drive drum tower 50 is not limited to any one particular conveyor system. Furthermore, it should be understood that conveyor systems are generally complex machines. Therefore, for purposes of this disclosure, all the conveyor system parts need not be illustrated.

The present drive drum tower 50, with drive drum bars 54, can be used to replace conventional, less hygienic equipment in a conveyor system, such as in a spiral conveyor system or otherwise. Spiral conveyor systems can be used in continuous freezers or ovens, for example. One use of a spiral conveyor is for the transfer of food intended for human consumption during thermal processing.

The overall diameter and height of the drive drum tower 50 depends on the particular application. Nonetheless, the drive drum tower 50 is constructed around a central post 62. The central post 62 may be driven around axis of rotation 60 by an electric motor and a gearbox or a chain and sprocket, for example. The drive drum tower axis of rotation 60 may be vertical or horizontal or any angle between vertical to horizontal.

The central post 62 can be made from one or more cylindrical or non-cylindrical tubes or rods, for example. The central post 62 can be made from a tube within a tube or from various tube sections of different radiuses with steps between the various sections. The central post 62 can be designed to accommodate a rotating water header, not shown, mounted on the top which supports a spray header used for cleaning.

Figure 5:
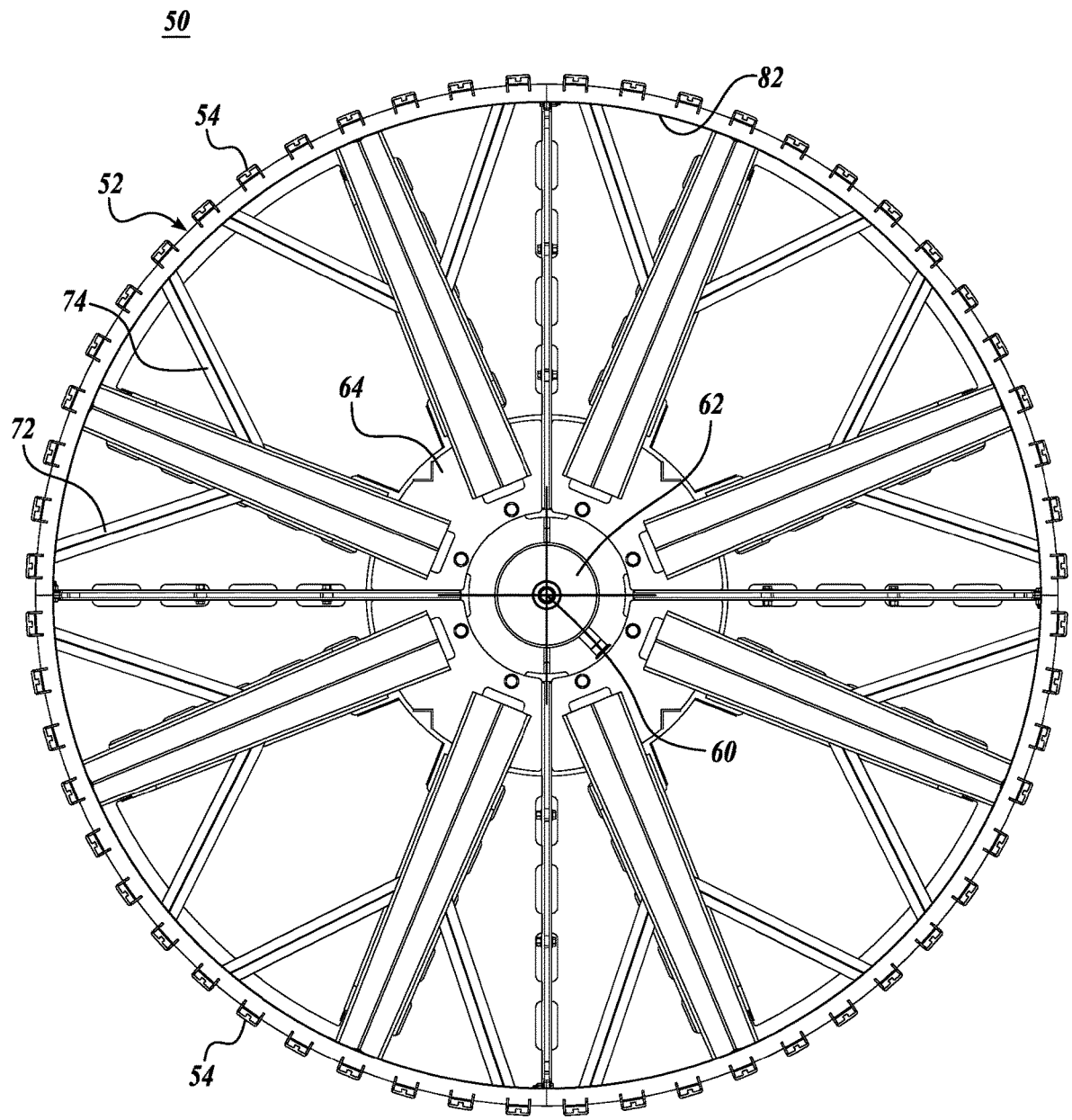
FIG. 5 is a top view of FIG. 4.
Figure 6:
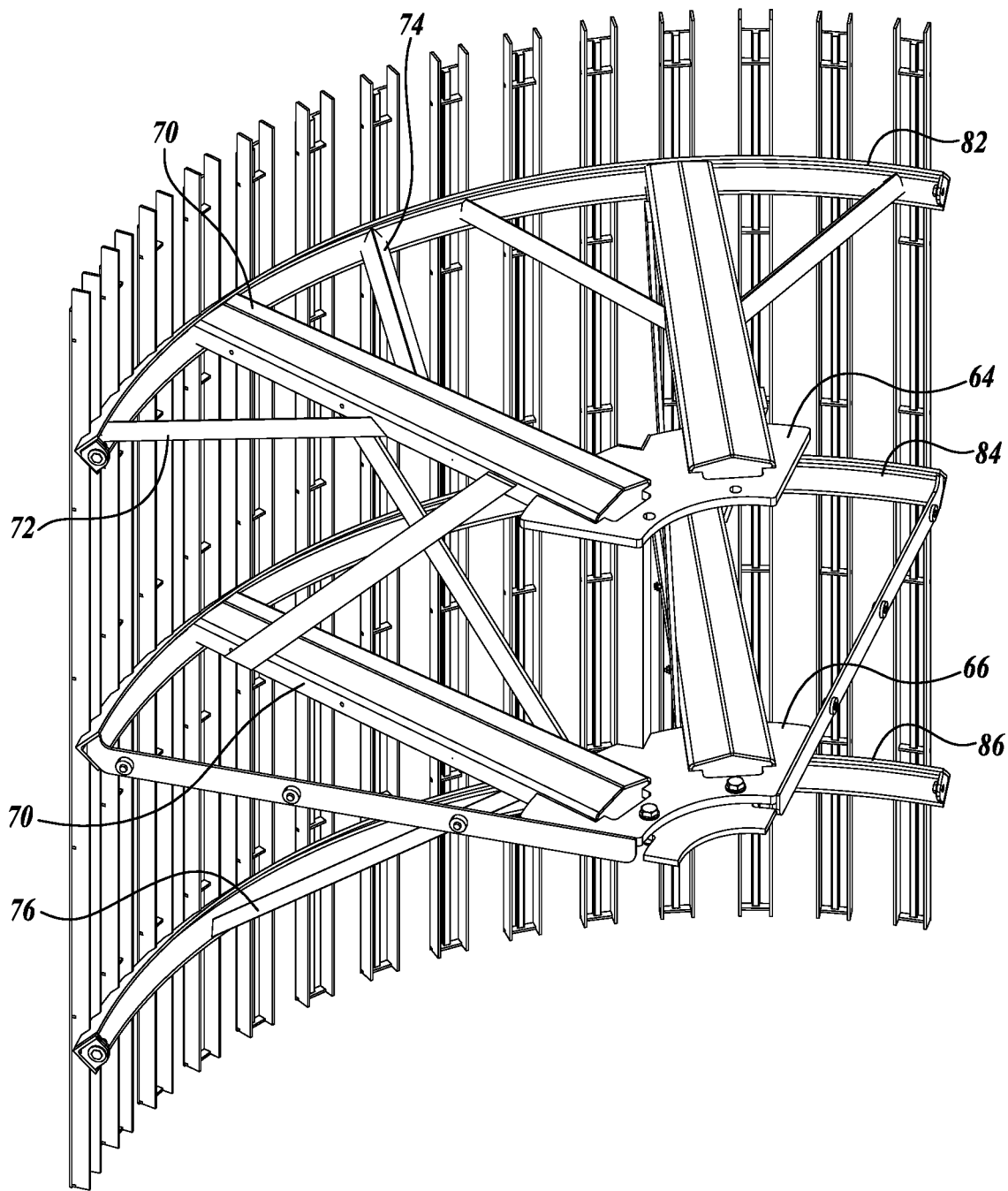
FIG. 6 is a partial isometric view of the interior of the drive drum of FIG. 4.

Referring also to FIGS. 4-6, the drive drum tower 50 is of open construction, composed to open structural members, such as vertically spaced apart flange central 64, 66, 68, and radial arms 70 that radiate outward from these flanges. Spreader arms 72, 74, diagonal braces 76, 78, vertical braces 80, and rings 82, 84, 86 form the drum structure that functions to support the drive drum bars 54 on the circumference of the drive drum frame 52.

However, depending on the size or application of a particular drive drum tower, not all of the above noted structural members may be used, and in very large drive drum towers additional structural members might be necessary.

In another embodiment, the drive drum tower 50 can simply be made from disks supported on continuous cylindrical tube. However, when the size of the drive drum tower 50 precludes a simple tube and disk design because of weight, the use of alternative weight-minimizing support structures is advantageous.

In the present drive drum tower design, a drum-like cage or frame 52 is constructed from the radial arms 70, spreader arms 72, 74, diagonal braces 76, 78, vertical braces 80, and rings 82, 84, 86, as noted above and as shown in FIGS. 4-6. Generally, the structural parts of the drive drum frame 52 will be metal, such as a stainless steel alloy or an aluminum alloy. The materials of construction and construction methods used for the drive drum tower 50 may need to be approved for the processing of food intended for human consumption.

The attachment of the flanges 64, 66, 68, radial arms 70, spreader arms 72, 74, diagonal braces 76, 78, vertical braces 80, and rings 82, 84, 86 to the central post 62 and to each other may be via welding or bolts or a combination of welding and bolts. The structural members can be designed for strength while reducing their weight. In this regard, these structural members may have cutouts or be hollow for reducing weight, and may employ I-beam, angle, channel, or box construction for strength while reducing weight.

Furthermore, the drive drum tower 50 may be constructed in sections, such as quarter sections as shown in FIG. 6, and in final assembly, these sections are assembled to form the completed cylindrical tower.

As noted above, and as shown in FIGS. 7-10, the drive drum bar 54 includes in basic form a backing frame 56 and an outwardly projecting cap 58 mounted on and supported by the backing frame. In this construction, the drive drum bar is mounted around the perimeter of the drive drum frame 52.

Figure 8:
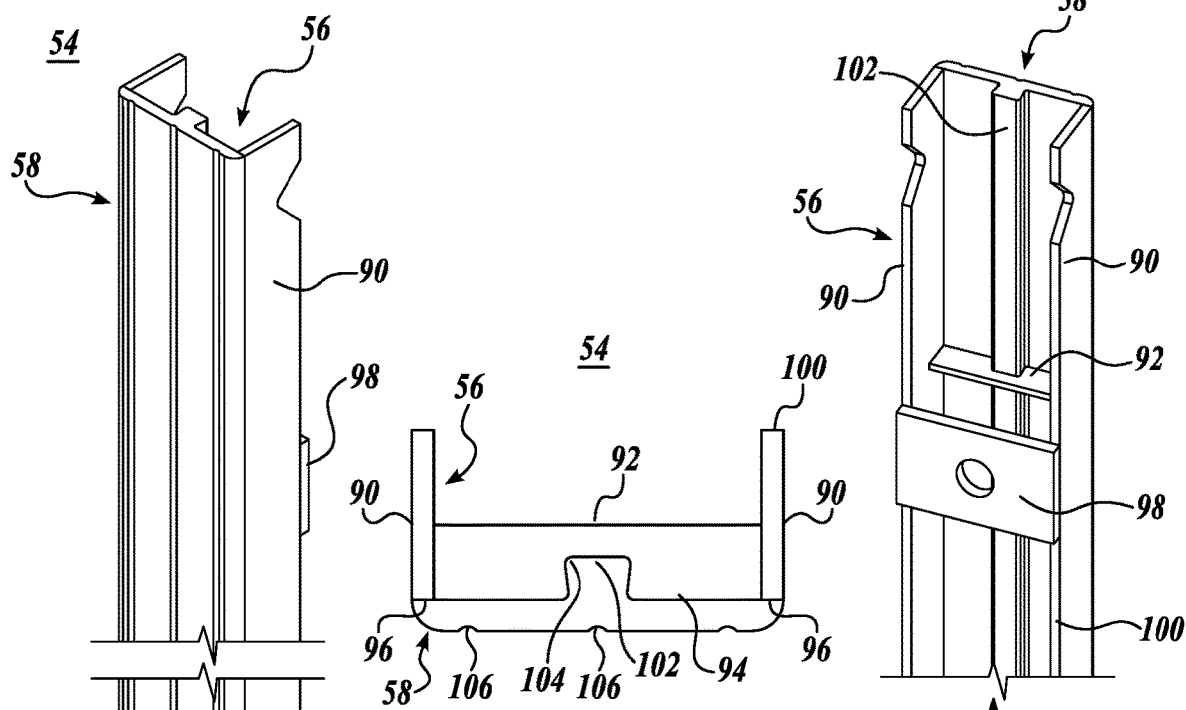
FIG. 8 is a top view of FIG. 7.

The backing frame 56 is composed of spaced apart longitudinal flange sections 90 that are tied together by a series of tie members 92. The tie members 92 span between the flange sections 90 at spaced apart locations along the lengths of the flange sections to retain the flange sections parallel to each other along the length of the bar 54. As shown in FIG. 8, the outward edge portions 94 of the tie members are coincide with or are flush with the corresponding edge portions 96 of the longitudinal flanges 90.

It is to be understood that the flange sections 90 can be supported relative to each other by means other than tie members 92. For example, a series of bars that are of round or of other cross sectional shapes can span between the flange sections.

Figure 9:
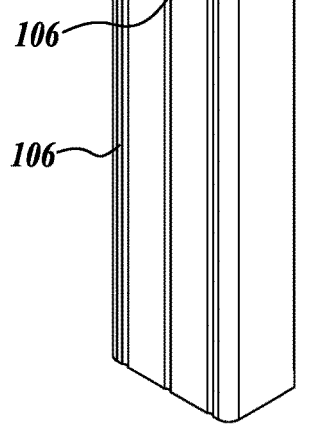
FIG. 9 is an isometric view of FIG. 7 taken from the opposite side of the drive drum bar of FIG. 7.
Figure 10:
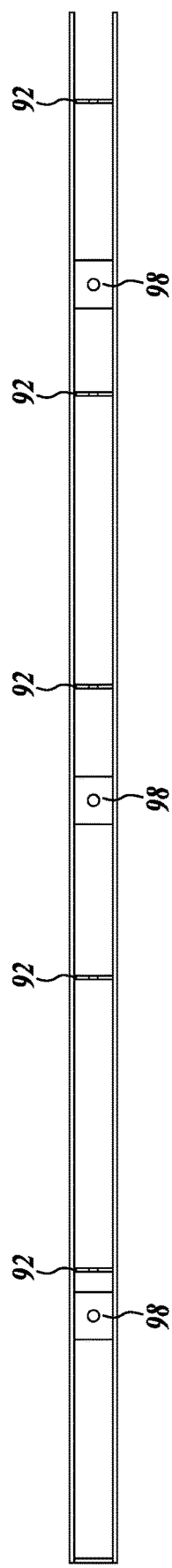
FIG. 10 is an elevational view of a backing from for the drive drum bar.

As shown in FIGS. 9 and 10, a plurality of attachments 98 are utilized for mounting the drive bar 54 to the drive drum frame 52. The attachments 98 in one example can be in the form of brackets or plates that span between the flange sections 90 to interconnect the flange sections at edges 100, which are at the opposite sides of the flange sections from the radially outwardly disposed edges 96, discussed above. The brackets/plates can be bolted, welded or otherwise affixed to the rings 82, 84 and 86 of the drive drum frame 52.

It can be appreciated that the attachments 98 can be of constructions other than in the form of the brackets or plates shown in FIGS. 9 and 10. For example, the flange sections can be welded directly to the drive drum frame.

Figure 7:
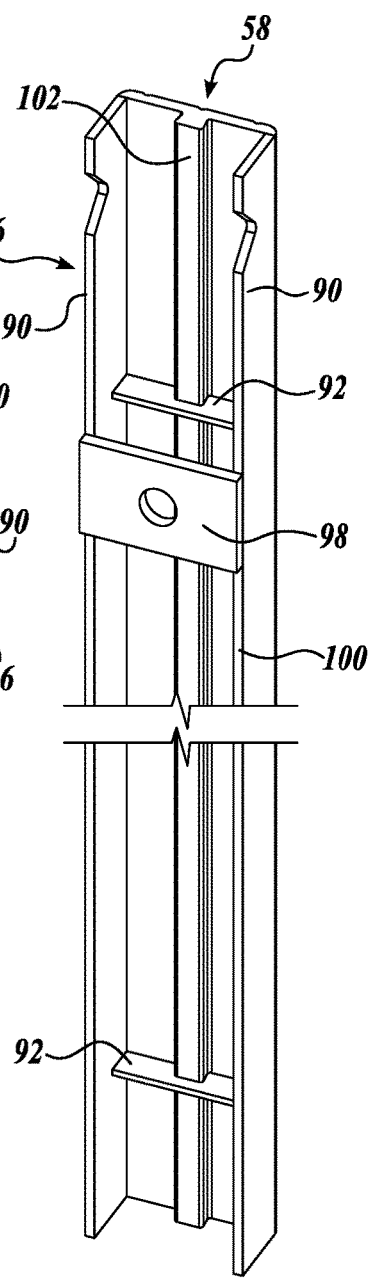
FIG. 7 is an isometric view of the drive drum bar of the present disclosure as viewed from the exterior side thereof.

As shown in FIGS. 7, 8, and 9, the drive bar cap 58 is generally planar and of a width to match the width of the backing frame 56. As such, there is very little overlap between the back surface of the drive bar cap 58 and the backing frame 56.

As shown in FIGS. 7, 8, and 9, a web portion 102 extends along the length of the back side of the drive bar cap 58. Such web portion 102 adds structural rigidity to the cap. Also, such web portion 102 is used to mount the cap 58 to the backing frame 56. In this regard, the web portion 102 in cross-sectional shape is that of a dovetail, see FIG. 8. The dovetail shape of the web portion 102 closely corresponds to the shape of a slot 104 formed in the tie members 92. It will be appreciated that the cap 58 may be conveniently mounted on the backing frame 56 by simply sliding the cap web portions 102 into and through the slots 104 formed in the tie members 92. There is sufficient friction between the cap 58 and the edge portions 96 of the backing frame to retain the cap portion in place. Moreover, the edge of the conveyor that bears against the cap 58 will also serve to retain the cap engaged with the backing frame 56.

As most clearly shown in FIGS. 7 and 8, grooves 106 extend along the exterior of the drive bar cap 58 for the full length of the cap. The grooves 106 enhance the "traction" between the surface of the cap 58 and the adjacent side of the conveyor belt being driven. It is to be understood that grooves of different shapes and patterns from that of groove 104 may be utilized. Alternatively, the cap 58 can be constructed without any grooves.

In terms of material composition, the backing frame 56 can be composed of the same material from which the drive drum frame 52 is constructed, perhaps stainless steel or other high strength metallic material that may be easily cleaned during the typical cleaning process for the drive drum tower 50 as well as for the conveyor belt being powered by the drive drum tower. Alternatively, the backing frame 56 can be constructed from a high strength polymer material, in which case the backing frame can be molded or extruded.

With respect to the cap 58, the material to construct the cap may be in the form of a polymer of high strength and durability as well as easily cleaned and disinfected during the normal cleaning regime employed for the drive drum tower and the conveyor belt. Examples of such polymers include, for example, UHMW polyethylene and in particular Acetal and HDPE.

It will be appreciated that the structure and method described above for attaching the drive drum cap 58 to the backing frame is only an example of one possible methodology. Other methods can be used for the attachment of the cover or cap 58 to the backing frame 56. It is noted, however, that through the use of the web portion 102 to engage with slots 104 formed in the tie members, there is very little overlap between the back surface of the cap and the adjacent edge of the tie members. This is consistent with the design philosophy of minimizing any overlap in the surfaces of the components that comprise the drive drum bars 54. Moreover, substantially the entire back side of the drive drum bar 54 is exposed, and thus may be effectively and conveniently cleaned and disinfected.

Figure 1:
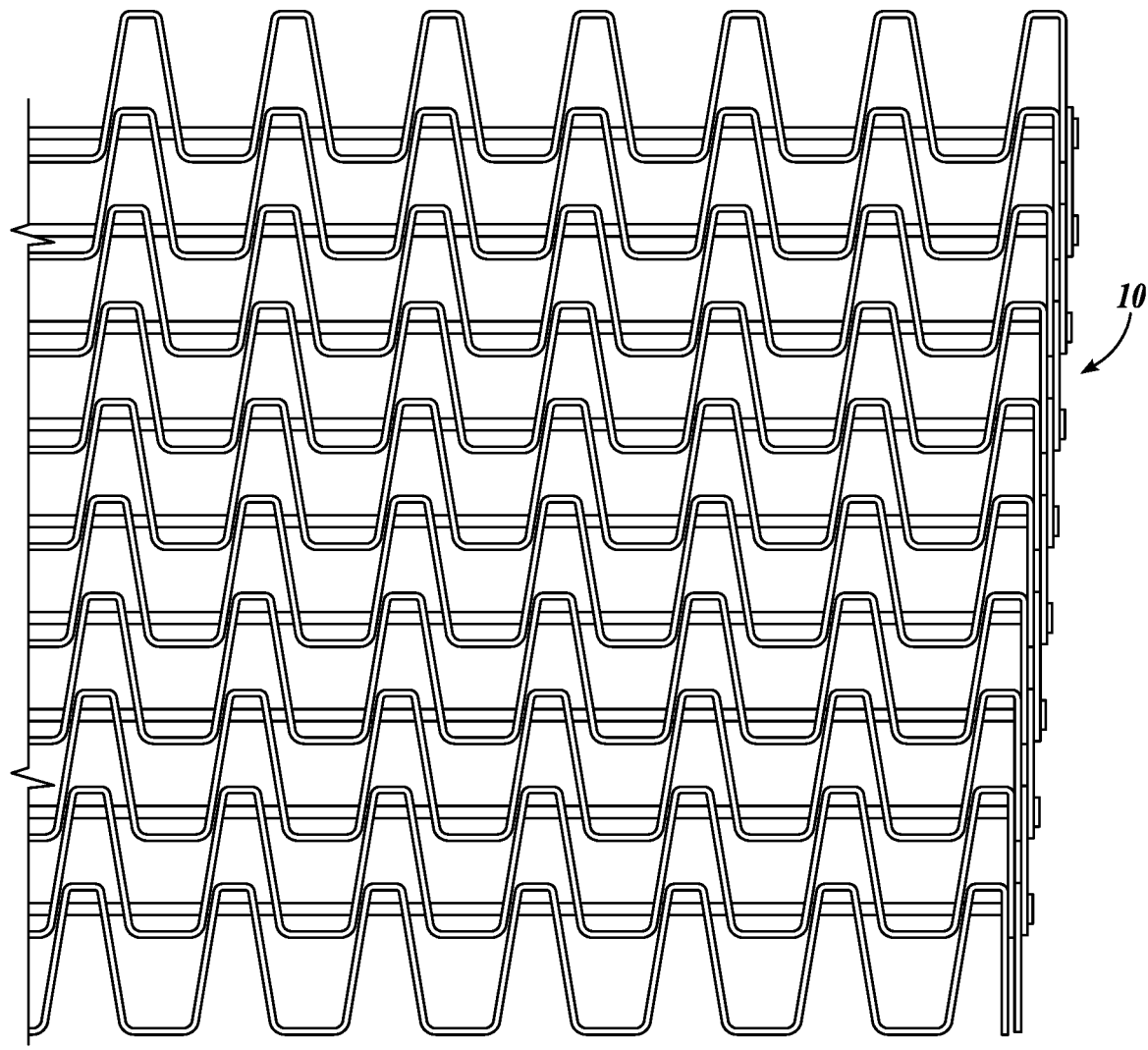
FIG. 1 illustrates a conveyor belt 10 that may be driven using a drive drum tower employing drive drum bars of the present disclosure.
Figure 2:
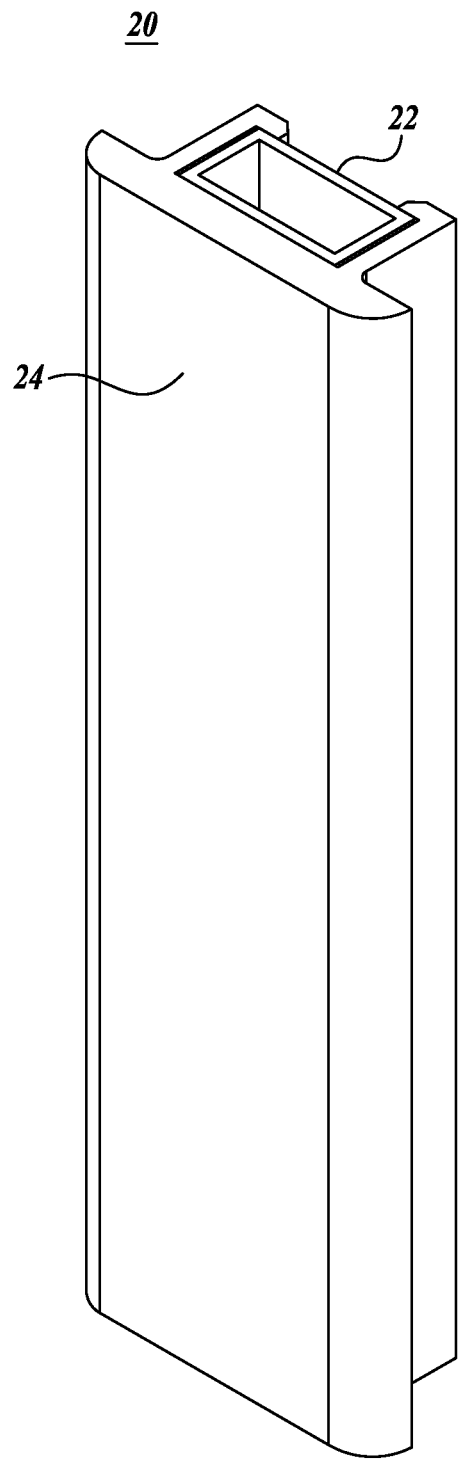
FIG. 2 is an isometric view of an existing drive drum bar 20.
Figure 3:
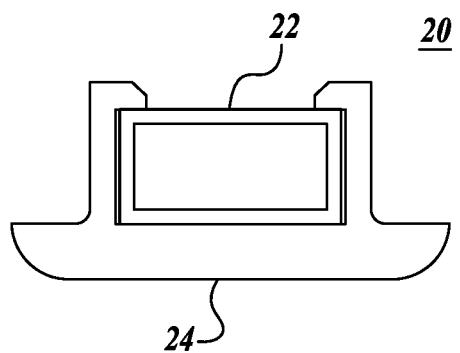
FIG. 3 is a top view of FIG. 2.

As noted above, and as shown in FIGS. 2 and 3, current drive drum bars are constructed with a hollow tube, the interior of which can harbor pathogens. Moreover, due to the length of such tubes and the relatively small interior cross-sectional areas, it is difficult to effectively and completely clean the interiors of such tubes.

Further, there is a substantial overlap in surface area between the current drive bar cap and the backing tube. Such overlap includes the entire surface of the tube facing the cap, the sides of the tube as well as portions of the back surface of the tube about which the cap partially wraps, see FIGS. 2 and 3. As such, there is considerable area of overlap between the cap and the drive bar that can create harborage areas for pathogens. Further, inspection of this area is not possible absent removing each of the caps from each of the drive bar tubes, which would be a very time consuming and laborious process.

While illustrative embodiments have been illustrated and described, it will be appreciated that various changes can be made therein without departing from the spirit and scope of the invention.

The embodiments of the invention in which an exclusive property or privilege is claimed are defined as follows:

1. A longitudinal drive drum tower rotatable about a central axis, comprising:
   a plurality of open profile drive drum bars extending along the length of the drive drum tower and disposed around the outer perimeter of the drive drum tower to face outwardly of the outer perimeter of the drive drum tower,
   the drive drum bar comprising:
   a frame comprising spaced longitudinal flange sections, the flange sections held at spaced apart relationship to each other and extending along the length of the drive drum tower and disposed radially to the central axis of the drive drum tower, each flange section presenting an outward longitudinal edge disposed in the direction radially outward of the drive drum tower; and
   a generally planar drive bar cap spanning between and overlapping the outward edges of the flange sections to project radially outwardly from the drive drum tower to present an outward abutment drive face to a conveyor belt driven by the drive drum tower.

2. The drive drum tower according to claim 1, further comprising tie members spanning between the flange section to hold the flange sections in spaced apart relationship to each other.

3. The drive drum tower according to claim 2, wherein the tie members retain the flange sections in spaced parallel relationship to each other.

4. The drive drum tower according to claim 2, wherein tie members are positioned at locations along the length or the flange sections.

5. The drive drum tower according to claim 1, further comprising mounting attachments for mounting the drive drum bars to the drive drum tower.

6. The drive drum tower according to claim 5, wherein the mounting attachments are spaced apart along the lengths of the drive drum bars.

7. The drive drum tower according to claim 1, wherein drive cap defines a web portion projecting from the drive cap in the direction opposite to the abutment drive face to engage portions of the frame to retain the drive cap attached to the frame.

8. The drive drum tower according to claim 7, wherein the frame is shaped to engage and retain the web portion.

9. The drive drum tower according to claim 7, wherein the web portion increases in width in the direction of projection from the cap.

10. The drive drum tower according to claim 1, wherein the cap is composed of a polymer material.

11. The drive drum tower according to claim 1, wherein at least one groove extends along the length of the cap drive face.

12. A spiral conveyor system, comprising:
    the drive drum tower of claim 1; and
    a conveyor having a lateral side engaged against a plurality of drive drum bars, wherein the conveyor is arranged in a spiral around the drive drum tower.

13. An open profile drive drum bar for a drive drum tower, comprising:
    a backing frame for mounting on a drive drum tower, the backing frame comprising spaced apart longitudinal flange sections extending longitudinally of the drive drum tower and having outward edge portions, the flange sections supported together so that the edges of each flange are in alignment with each other and project outwardly from the drive drum tower; and
    a generally planar drive cap spanning between the outward edge portions of the flange sections that are in alignment with each other to present an outward abutment drive face to a conveyor belt engaged by the drive drum tower.

14. The drive drum bar according to claim 13, further comprising tie members spanning between the flange sections at spaced apart locations along the lengths of the flange sections.

15. The drive drum bar according to claim 13, wherein the tie members retain the flange sections in spaced parallel relationship to each other.

16. The drive drum bar according to claim 13, further comprising mounting attachments for mounting the drive drum bars to the drive drum tower.

17. The drive drum bar according to claim 13, wherein the drive cap defines a web portion projecting from the drive cap in the direction opposite to the drive face to engage portions of the frame to retain the drive cap attached to the frame.

18. The drive drum bar according to claim 17, wherein the web portion extends substantially the entire length of the drive cap.

19. The drive drum bar according to claim 17, wherein the web portion increases in width in the direction of projection from the cap.

20. The drive drum bar according to claim 13, wherein the cap is composed of a polymer material.

21. The drive drum bar according to claim 13, wherein at least one groove extends along the length of the cap drive face.

* * * * *